United States Patent [19]

Ottaviani et al.

[11] 4,387,194

[45] Jun. 7, 1983

[54] HIGH SOLIDS INTERNALLY U.V. STABILIZED MELAMINE CURED URETHANE PAINT

[75] Inventors: Robert A. Ottaviani, Washington; William T. Short, Southfield, both of Mich.

[73] Assignee: General Motors Corporation, Detroit, Mich.

[21] Appl. No.: 400,730

[22] Filed: Jul. 22, 1982

[51] Int. Cl.$^3$ ............................................. C08G 18/38
[52] U.S. Cl. .................................... 525/454; 525/509; 525/520; 528/49; 528/51; 528/60; 528/66; 528/73
[58] Field of Search ...................... 525/454, 509, 520; 528/73, 49, 51, 60, 66

[56] References Cited

U.S. PATENT DOCUMENTS 4,243,792  1/1981  Short ..................................... 528/73

Primary Examiner—Maurice J. Welsh
Attorney, Agent, or Firm—Elizabeth F. Harasek

[57] ABSTRACT

Novel, low viscosity, high solids paint compositions have been created which provide durable, high gloss surface finishes when they are applied to and cured over suitable substrates. The paints are based on urethane binder resins formed by initially reacting a hindered piperidinol ultraviolet stabilizer with a stoichiometric excess of aliphatic polyisocyanate. This reaction product is in turn reacted with a stoichiometric excess of polyether polyols. The paint compositions are cured by crosslinking the urethane binder resins at the unreacted functional hydroxyl groups of the polyol constituents by means of acid catalyzed, melamine formaldehyde crosslinking agents. Cure can generally be fully accomplished in a short time at temperatures below about 250° F. The cured paint has piperidine groups chemically incorporated within its molecular structure to effectively inhibit the degradation of the urethane linkages and the loss of gloss by ultraviolet radiation.

7 Claims, 1 Drawing Figure

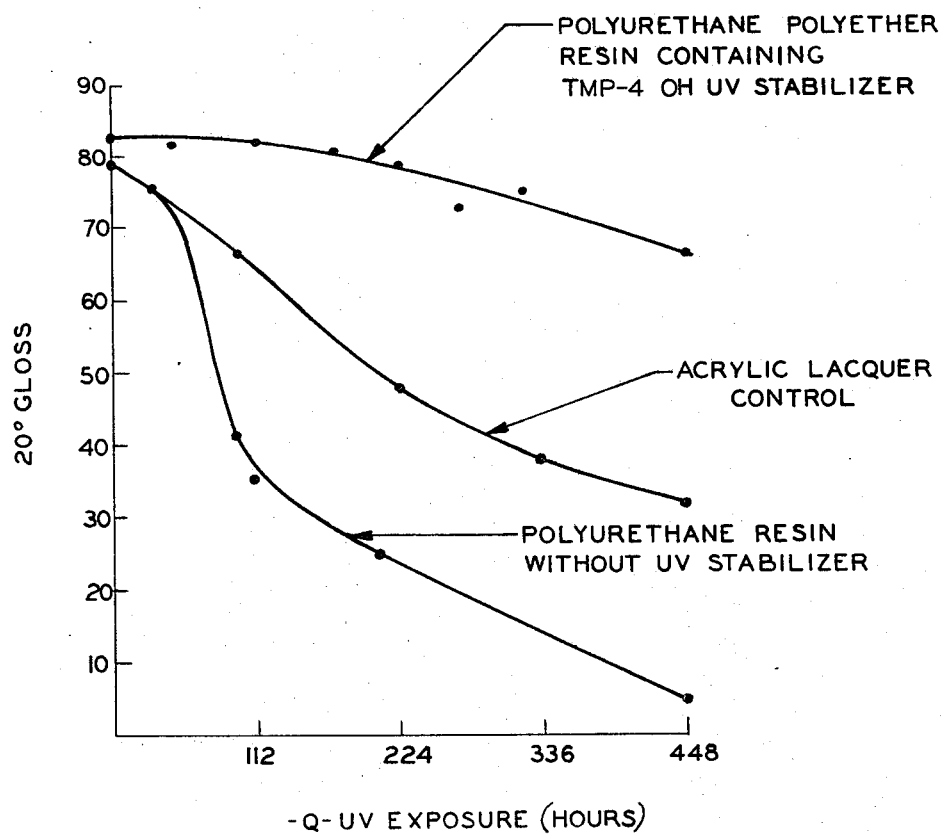

HIGH SOLIDS INTERNALLY U.V. STABILIZED MELAMINE CURED URETHANE PAINT

BACKGROUND OF THE INVENTION

This invention relates to an ultraviolet (U.V.) stable, sprayable, high solids urethane paint composition characterized by a durable, high gloss surface when applied to and cured over a suitable substrate. The invention also relates to a method of making such paint by reacting hindered piperidinol ultraviolet stabilizing agents into a paint resin which is crosslinked by an acid catalyzed, melamine formaldehyde, crosslinking agent at relatively low temperatures.

Urethane coating compositions are well known for their toughness, flexibility, impact resistance, and first class glossy surface finish. However, urethane paints are susceptible to loss of gloss when exposed to ultraviolet radiation (sunlight, e.g.,) and moisture. Thus, they have not generally been considered suitable for use as automotive topcoats.

William T. Short, an inventor of the subject invention, earlier described a U.V. and moisture resistant urethane paint system in U.S. Pat. No. 4,243,792 assigned to the assignee hereof. The patent relates to the incorporation of hindered piperidinol esters of aliphatic carboxylic acids in urethane polymers for U.V. stabilization. The paints were formed by reacting a stoichiometric excess of suitable aliphatic polyisocyanate with a mixture of organic triols, diols and the hindered piperidine stabilizer. The reactions were catalyzed by an organometallic catalyst such as dibutyl tin dilaurate. The paint itself was moisture cured at the unreacted isocyanate groups under conditions of high relative humidity and low temperatures. A disadvantage of this earlier paint system was the presence of the free isocyanate end groups on the uncured paint. These groups are highly reactive necessitating careful handling of the paint to prevent premature reaction, and some people may develop allergic sensitivity upon extended exposure. Thus, it would be preferable to have a paint composition with no appreciable amount of reactive isocyanate groups.

Due to the high volume nature of most automotive paint operations, it is also extremely desirable to increase the resin to solvent ratio. Currently most automotive paint systems are based on sprayed acrylic enamels. In order to obtain the physical and appearance properties required for automotive topcoats, a minimum resin molecular weight of about 15,000 is necessary. However, in this molecular weight range, acrylic resins can generally comprise no greater than about 50 (and usually less than 30) weight percent of the paint. Considerable energy is expended in evaporating solvent from low solids paints in the paint ovens. Moreover, means must be provided for handling fugitive solvent.

Accordingly, it is an object of this invention to provide a sprayable, high solids urethane paint composition that is characterized by a durable high gloss surface finish resistant to ultraviolet degradation. It is a further object of our invention to provide polyurethane paint resin without free isocyanate groups in which a piperidine U.V. stabilizer is chemically incorporated. A more particular object is to incorporate such piperidine U.V. stabilizer in a paint resin which is cured by crosslinking functional hydroxyl groups with an acid catalyzed, melamine formaldehyde crosslinking agent.

Another object of the invention is to provide a method of making such U.V. stable, low energy curing, urethane paint resins by reacting a hindered piperidinol ultraviolet stabilizing agent with excess polyisocyanate and thereafter reacting the product of this reaction with a stoichiometric excess of polyether polyol to create a paint resin that can be crosslinked by means of an acid catalyzed melamine formaldehyde crosslinking agent.

A specific object of the invention is to provide a production sprayable, low viscosity automotive quality topcoat paint formulation containing a minimal amount of volatile solvent. Another specific object is to create such a high solids paint which will cure in a relatively short period of time at relatively low temperatures.

BRIEF SUMMARY OF THE INVENTION

In accordance with the preferred practice of our invention, these and other objects may be accomplished as follows. An acid catalyzed, melamine formaldehyde crosslinkable polymer binder resin is prepared by mixing a hindered piperidine having a functional hydroxy group (herein piperidinol) ultraviolet stabilizing agent with a substantial stoichiometric excess of a polyfunctional isocyanate. The reaction yields a piperidine group-terminated isocyanate prepolymer. A preferred piperidinol U.V. stabilizer is 2,2,6,6-tetramethyl-4-piperidinol (TMP-4-OH), and a preferred aliphatic isocyanate is methylene bis(4-cyclohexyl isocyanate) ($H_{12}MDI$). The isocyanate terminated prepolymer is then reacted with a stoichiometric excess of polyether polyol, preferably a mixture of polyoxypropylene diols and triols. The ratio of diols to higher functionality polyols may be adjusted to provide desired hardness, toughness and flexibility in the cured paint. In a preferred formulation, approximately equal chemically equivalent amounts of diol, triol and diisocyanate (i.e., about one third of the total equivalents each) are present in the paint resin compositions along with a few percent piperidinol U.V. stabilizer on an equivalent basis.

The initial reaction of the piperidinol and excess isocyanate creates an isocyanate terminated constituent having piperidine U.V. stabilizer attached to an end of a portion of the diisocyanate molecules. The piperidine attachment is a urethane linkage formed at the functional hydroxyl group of the piperidinol starting material. This urethane bond is stable during the subsequent reaction of the diisocyanate prepolymer with the polyols and during the acid crosslinking of the resin. That is, the crosslinking brought about by the reaction of a melamine formaldehyde in the presence of a weak acid catalyst does not displace the piperidine in the paint resin. It is therefore reacted into the cured paint to stabilize it against U.V. degradation. A competing reaction between the isocyanate and the piperidinol is the formation of weak urea linkage between the nitrogen of the piperidine ring and the isocyanate end groups. However, this linkage did not appear to be stable with respect to subsequent reaction with either the polyol or the acid catalyst used for crosslinking.

The preferred crosslinking agents for the subject paint resins are partially methylated melamine resins. These are made by prereacting less than 6 moles of formaldehyde (preferably about 3 moles) with each mole of melamine. The reaction causes the addition of hydroxymethyl groups to the amine groups of the melamine resin. In acid environments (pH preferably less than 5) at elevated temperatures (preferably about 250° F.), these melamine formaldehydes react with the hydroxy groups of the paint resin to form complex crosslinked polymer structures. One preferred acid catalyst is dimethylpyrophosphoric acid. Unique to this invention is the incorporation of a piperidine U.V. stabilizer in the paint that is not adversely affected by the acid catalyzed melamine cure.

Thus the subject invention provides durable paint finishes which are extremely stable to moisture and ultraviolet radiation exposure. We have found that merely combining conventional piperidinol U.V. stabilizers, isocyanates and excess polyols yields severely flocculated paints that are not U.V. stable.

DETAILED DESCRIPTION OF THE INVENTION

These and other objects and advantages of our invention will be better understood in view of the FIGURE which is a plot of measured gloss versus accelerated ultraviolet and moisture exposure for a U.V. stabilized paint resin of the subject invention, a conventional acrylic laquer topcoat and a polyurethane resin system without U.V. stabilizer. The invention may be further understood in view of the following description and specific examples.

It is well-known that saturated cyclic and aliphatic polyisocyanates are more stable to ultraviolet radiation than unsaturated cyclic, straight chain or branched isocyanates. Therefore, the preferred polyisocyanates for the subject invention include such compositions as methylene bis(4-cyclohexyl isocyanate), isophorone diisocyanate, hexamethylene diisocyanate, and 1,4-cyclohexane bis(methyl isocyanate). The first mentioned compound is a preferred diisocyanate for the subject invention. It is a liquid sterioisometric mixture originally sold under the trade name of "Hylene W" by Dupont that is available as of the filing date thereof as Desmadur-W ®, sold by Mobay. The material is sometimes generically referred to as $H_{12}MDI$. Analysis showed it to be greater than about 99.2% purity. The isocyanate constituent should have a functionality of at least about 2 to assure a chemically crosslinked paint product. In the subject compositions, the paint is cured by crosslinking hydroxyl groups carried on a polyether constituent. The isocyanate groups are fully reacted with hydroxyl groups during resin synthesis.

The flexibilizing constituents of the subject urethane paints are preferably polyether polyols. These polyols have been found to provide conventional moisture cured urethane paints with such properties as high gloss, high distinctness of image, impact resistance and chip resistance. The preferred polyethers are blends of polyoxypropylene diols and triols. Other polyether polyols, based on polyethylene oxide, e.g., may also be used if they have suitable U.V. stability and workable viscosities. Table I lists a number of polyethers that were used.

TABLE I
SELECTED POLYPROPYLENE OXIDE POLYETHERS

| Material[a] | Functionality | % Solids | Viscosity @ 25° C. (Centipoise) | Hydroxyl Number | Molecular Weight |
|---|---|---|---|---|---|
| P-410 | 2 | 100 | 75 | 265 | 424 |
| P-1010 | 2 | 100 | 150 | 105 | 1050 |
| TP-440 | 3 | 100 | 600 | 398 | 423 |
| TP-1540 | 3 | 100 | 350 | 110 | 1530 |

[a]All polypropylene oxide polyethers were obtained from BASF Wyandotte under the trade name Pluracol ® resins.

Alkylated amino resins are known crosslinking agents for industrial coatings. Outstanding properties such as hardness, high gloss, clarity and durability are provided by melamine curatives. Thus, melamine crosslinking agents are preferred for our novel U.V. resistant urethane coatings. We have found partially methylolated melamine resins to be suitable. These are commercially available and may be formed by reacting less than six moles of formaldehyde with one mole of melamine in a methanol solution. The reaction yields a methylolated melamine. A preferred curing agent for this invention is trimethylol melamine dissolved in butanol that is sold by American Cyanamid under the trade designation Cymel ®325. Generally, the melamine curing agent should be present in amounts adequate to react with substantially all of the free hydroxyl groups of a urethane binder resin to be crosslinked. About 40 grams of trimethylol melamine was used per equivalent of free hydroxy to cure the subject urethane binder resins. Fully methylolated (hexamethylated) melamine does not work.

In order to cure the subject paint resins in reasonable times at relatively low temperatures, it is necessary to catalyze, i.e., accelerate, the melamine crosslinking reaction. The preferred catalysts are weak acids soluble in organic solvents. A preferred catalyst is dimethyl pyrophosphoric acid (DMPA) sold by American Cyanamid as Cycat ®296.9.

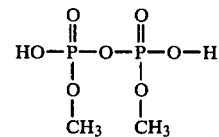

About 2.5 weight percent DMPA (excluding solvent weight) was used based on the weight of trimethylol melamine, about 3 percent being preferred.

Compatible solvents such as cellosolve acetate, methyl ethyl ketone (MEK), butyl alcohol, etc. are incorporated consistent with normal paint practices. Likewise, pigments, fillers and other paint additives may be incorporated so long as they do not interfere with the invention.

EXPERIMENTAL BACKGROUND

Of the isocyanates examined, methylene bis(4-cyclohexyl isocyanate) ($H_{12}MDI$) produced the most satisfactory paints. When crosslinked with melamine formaldehyde resin, high gloss tough films were produced. Table II lists four polyurethane-polyester resin compositions characteristic of our investigation. The polyether polyols we used are described in Table I. In the practice of our invention the preferred molecular weight range for the diol constituent is about 300 to 1500 grams per mole and for the triol, about 300 to 2500 grams per mole.

TABLE II
POLYURETHANE-POLYETHER RESIN COMPOSITIONS

| | | |
|---|---|---|
| 1. Urethane Resin IA | | |
| Diol P1010[a] | 87.0g | (0.166 equivalents) |
| Triol TP440[a] | 71.7g | (0.509 equivalents) |
| Triol TP1540[a] | 44.2g | (0.087 equivalents) |
| Diisocyanate $H_{12}MDI$[b] | 17.2g | (0.133 equivalents) |
| R = 5.73, b = 0.78 | | |
| 2. Urethane Resin IIB | | |
| Diol P1010[a] | 87.0g | (0.164 equivalents) |
| Triol TP440[a] | 71.7g | (0.505 equivalents) |

TABLE II-continued
POLYURETHANE-POLYETHER RESIN COMPOSITIONS

|   |   |   |   |
|---|---|---|---|
|   | Triol TP1540[a] | 44.2g | (0.084 equivalents) |
|   | Diisocyanate H$_{12}$MDI[b] | 30.3g | (0.231 equivalents) |
|   | R = 3.26, b = 0.78 |   |   |
| 3. | Urethane Resin IIIC |   |   |
|   | Diol P1010[a] | 87.0g | (0.164 equivalents) |
|   | Triol TP440[a] | 71.7g | (0.505 equivalents) |
|   | Triol TP1540[a] | 44.2g | (0.084 equivalents) |
|   | Diisocyanate H$_{12}$MDI[b] | 43.4g | (0.331 equivalents) |
|   | R = 2.27, b = 0.78 |   |   |
| 4. | Urethane Resin IVD |   |   |
|   | Diol P1010[a] | 87.0g | (0.164 equivalents) |
|   | Triol TP440[a] | 71.7g | (0.505 equivalents) |
|   | Triol TP1540[a] | 44.2g | (0.084 equivalents) |
|   | Diisocyanate H$_{12}$MDI[b] | 56.5g | (0.431 equivalents) |
|   | R = 1.75, b = 0.78 |   |   |

[a]BASF Wyandotte - Pluracol ® resins
[b]E. I. DuPont de Nemours and Company - Hylene ® W
R = equivalents of H$_{12}$MDI per total equivalents polyol
b = branching coefficient Other polyether polyols with functionalities of at least two may be used. The branching coefficient (b) which is defined herein as the equivalents of triol per total equivalents of hydroxyl was held constant at about 0.78. R represents the chemical equivalents of H$_{12}$MDI per total chemical equivalents of hydroxyl groups in the polyether polyol. In all cases, a substantial equivalent excess of polyol to isocyanate was used, the preferred value for R being in the range of about 1.4 to 5.0. The excess hydroxyl is necessary to provide sights on the urethane resin for crosslinking with melamine agents during paint cure.

Table III shows the molecular weight characteristics of these urethane resin compositions determined by gel permeation chromatography. Some had viscosities at 100 weight percent resin (i.e., without solvent) of less than 10,000 centipoise. This means that a substantially solvent free paint is possible that still has a viscosity low enough to apply it by spraying, dipping or other such means.

TABLE III
MOLECULAR WEIGHT CHARACTERISTICS AND COMPOSITION OF POLYURETHANE/POLYETHER RESIN SYSTEMS

| Material Designation | $\overline{M_n}$ | $\overline{M_w}$ | Index of Heterogeniety ($\overline{M_w}/\overline{M_n}$) | Weight Fraction Diol Polyether | Weight Fraction Triol Polyether |
|---|---|---|---|---|---|
| LA | 1500 | 2900 | 1.93 | 0.270 | 0.297 |
| IIB | 2800 | 4900 | 1.75 | 0.179 | 0.165 |
| IIIC | 4200 | 9600 | 2.28 | 0.111 | 0.083 |
| IVD | 7200 | 34100 | 4.74 | 0.061 | 0.035 |

Table IV gives the formulation and properties of a white high gloss topcoat formulation based on urethane resin IIB above. This film was cured for 30 minutes at 107° C. (225° F.) in the presence of acid catalyzed trimethylol melamine crosslinking agent. The subject coatings can generally be cured at temperatures of about 225° F. or higher in 30 minutes.

TABLE IV
FORMULATION AND PROPERTIES OF A WHITE TOPCOAT BASED ON POLYURETHANE RESIN IIB

| Material | Weight (g) |
|---|---|
| A. FORMULATION | |
| Resin IIB | 160 |
| Titanium Dioxide[a] | 128 |
| Cymel ® 325[b] | 200 |
| Cycat 296[c] | 10 |
| Cellosolve Acetate | 40 |
| Methyl Ethyl Ketone | 70 |
| Butyl Alcohol | 40 |
| B. PROPERTIES | |
| Pigment/Binder Ratio | 0.4 |
| Polyol/Melamine Ratio | 1.0 |
| Total Weight Solids | 75% |
| Gloss (20° meter) | 82–83 |
| Knoop Hardness | 6.5–7.0 KHN |
| Forward Dart Impact | 15.8 joules (140 inch pounds) |
| Reverse Dart Impact | 10.1 joules (90 inch pounds) |

[a]Glidden-Durke RCl-6 Pigment
[b]American Cyanamid; 4 weight parts trimethylol per 1 weight parts butanol
[c]American Cyanamid; equal weight parts dimethyl pyrophosphoric acid and butanol The gloss, indicated as "Gloss (20° meter)" is a number that is the percent of a beam of incident light reflected at 20° to a plane perpendicular to the painted panel measured using a Hunter Lab glossmeter. Readings were taken at five different locations on each panel and averaged. Initial gloss for this white paint was 82–83 percent. The Knoop hardness was 6.5 to 7.0, and the paint had forward and reversed impacts of 15.8 and 10.1 joules, respectively. Thus, this white, glossy, urethane paint exhibited physical properties which would make it an excellent candidate for automotive topcoat applications. However, the major disadvantage of this system compared to conventional acrylic lacquer or enamel systems is its poor U.V. stability. Without stabilizing the paint against U.V. and moisture degradation, it would not be useful.

Hindered piperidine compounds are known to provide varying degrees of U.V. stabilization to urethane paints. One such composition is bis-(2,2,6,6-tetramethyl piperidinyl-4)sebacate.

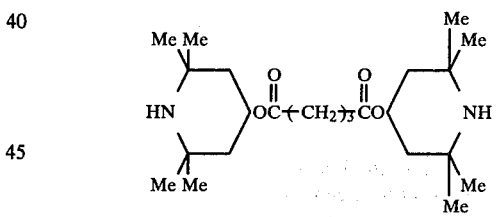

This hindered amine U.V. stabilizing agent is sold under the trade name Tinuvin 770 ® by Ciba-Geigy. It has been incorporated in the polymer backbone of moisture cured urethane paint as disclosed in U.S. Pat. No. 4,243,792.

In the subject melamine cured system, however, Tinuvin 770 ® was not found to be a satisfactory U.V. stabilizer. The piperdine molecule contains an amine functionality. This amine is a strong base with a pKa value of approximately 11.0. Thus, when Tinuvin 770 ® was added to any of the above paint formulations, it reacted very rapidly with the acid catalyst for the melamine cure to form an insoluble amine salt. The salt precipitated out of the paint forming highly flocculated coatings. No U.V. stability was provided by the precipitated Tinuvin 770 ®.

Attempts were then made to incorporate Tinuvin 770 ® into the polyurethane backbone to prevent its precipitation. The approach taken was to react Tinuvin 770 ® with an excess of diisocyanate prior to the addition of polyether polyols. This should have resulted in end-capping of the piperidinyl sebacate with an isocyanate group. Further reaction of the polyether polyol should have then resulted in incorporation of the U.V. stabilizing agent into a polyurethane structure. However, all attempts to achieve this end result failed. We have developed the following theory to explain these results.

Infrared spectroscopic analysis of the reaction mixture revealed that reacting the Tinuvin 770® with excess diisocyanate formed urea linkages between them. This was clearly indicated by the appearance of a peak at 1670 $CM^{-1}$ representing the carbonyl stretching vibration. However, we believe that only about 70% of the amine groups were converted to the urea and 30% of the U.V. stabilizer never reacted in at all. This is probably due in part to the extreme steric hindrance of the four methyl groups around the amine functionality of the piperidine. The results of adding the polyether polyol indicated that the reaction between the polyol and isocyanate was preferred. The piperidine stabilizer was apparently driven out of the polymerized constituent by breaking the urea bonds. The Tinuvin 770® then precipitated with the acid catalyst.

Attempts were made to stabilize the system with other commercially available U.V. stabilizers. Two types of stabilizers were selected, the first being an ultraviolet absorber, Tinuvin 328® (Ciba-Geigy) and the second a tertiary hindered amine, Tinuvin 144® (Ciba-Geigy). The latter material was chosen because it was advertised as an alternative to Tinuvin 770® for acid containing systems. Though these U.V. stabilizers were reported to be effective in other polyurethane systems, they were not compatible with the melamine cured polyurethane polyether systems we had developed.

Thus, conventional U.V. stabilizers for polyurethane paints were not found to be useful or effective in our compositions. Therefore, a novel approach was taken to stabilizing the system with hindered amine U.V. stabilizers. This approach will be better understood in view of the following specific examples.

EXAMPLE I

In accordance with this invention we have discovered a method and means for stabilizing melamine cured, acid catalyzed, urethane paints of the type discussed above against degradation due to exposure to ultraviolet radiation and moisture. Referring to Table V, a resin composition and paint were formulated as follows.

TABLE V

RESIN COMPOSITION AND COATING FORMULATION OF A U.V. STABLE POLYURETHANE/POLYETHER COATING SYSTEM

1. Resin VE

| | | |
|---|---|---|
| Diol P1010[a] | 174.0g (0.329 equivalents) | |
| Triol TP 440[a] | 143.4g (1.01 equivalents) | |
| Triol TP 1540[a] | 88.4g (0.168 equivalents) | |
| Diisocyanate $H_{12}MDI$[b] | 70.6g (0.539 equivalents) | |
| TMP-40H | 6.1g (0.039 equivalents) | |
| Methyl Ethyl Ketone | 120.5g | |
| R = 3.01, b = 0.78 | | |

2. Formulation

| Material | Weight (g) | Percent Non-Volatiles |
|---|---|---|
| Resin VE | 50 | 80 |
| Titanium Dioxide[c] | 32 | 100 |

TABLE V-continued

RESIN COMPOSITION AND COATING FORMULATION OF A U.V. STABLE POLYURETHANE/POLYETHER COATING SYSTEM

| | | |
|---|---|---|
| Cymel® 325[d] | 50 | 80 |
| Cycat® 296-9[e] | 2.4 | 50 |
| Methyl Ethyl Ketone | 37.5 | 0 |
| Iso-Butyl Alcohol | 18.5 | 0 |
| Butyl Carbitol | 4.5 | 0 |
| Total Constituents | 194.9 | 58 |

[a]BASF Wyandotte - Pluracol® resins
[b]E. I. DuPont de Nemours and Company - Hylene® W
[c]Glidden-Durkee; RCl-6
[d]American Cyanamid, 4 weight parts trimethlol melamine per weight part butanol
[e]American Cyanamid, equal weight parts dimethyl pyrophosphoric acid and butanol 6.1 Grams of 2,2,6,6-tetramethyl-4-piperidinol (TMP-40H) a monohydroxy hindered piperidine, was dissolved in 120.5 g of warm dry methyl ethyl ketone. To this solution, 70.6 g (0.539 equivalents) of $H_{12}MDI$ was added and the mixture was refluxed for 3 to 4 hours at about 82° C. We believe that this causes substantially all of the piperidine molecules to react with isocyanate at the piperidine's hydroxyl functionality. Thus, the piperidinol is chemically bonded to the isocyanate constituent by means of stable urethane linkages.

Thereafter, all of the polyether polyol was added. A substantial chemically equivalent excess (1.507 equivalents; R=3.01) of polyol is required so that there is substantially no free isocyanate in the reaction product but there are functional hydroxyl groups available for crosslinking. The polyol is generally refluxed with the other constituents long enough to assure that substantially all of the isocyanate reacts with it. The reaction product is a urethane paint resin with a reacted-in piperidinol constituent.

To make a heat curable white paint, 32 g titanium dioxide and 40 g of trimethylolmelamine in 10 g of butanol (Cymel®325) were passed through a sand mill together. The resultant paste was diluted with 37.5 g MEK, 18.5 g isobutyl alcohol and 4.5 g butyl carbitol. The last added constituent was 1.2 g dimethyl pyrophosphoric acid in 1.2 g butanol (2.4 g Cycat®296-9).

The "Percent Non-Volatiles" refers to that portion of a constituent that is not volatile solvent. The composition of Table VI calculated on that basis had a solids content of 58 percent.

The paint was sprayed as a topcoat over Bonderite 40 phosphated steel test coupons which had been primed with Inmont Corporation's lacquer primer/surfacer (No. U28AD025). The topcoating was cured for 30 minutes at 107° C. The resultant finish was mirror smooth and had a very high initial measured 20° gloss of 83 percent.

These painted coupons, and like coupons coated with a conventional production acrylic lacquer topcoat, and like coupons coated with a polyurethane-polyester paint without a piperidine stabilizer were all subjected to accelerated ultraviolet radiation aging tests in a commercially available QUV Accelerated Weathering Cabinet that is widely used in the coating industry to evaluate coating systems.

The utility of the QUV cabinet is in obtaining accelerated testing with respect to the effects of ultraviolet radiation (simulating sunlight) and humidity on paints, plastics and other organic material. The correlation between hours of exposure to UV light in the QUV cabinet and months of exposure to sunlight varies with the material being tested. However, in general, those materials showing good resistance to accelerated weathering also are resistant to degradation by sunlight and weather.

Referring to the FIGURE, it is evident that the piperidinol stabilized white paint of this Example retained its gloss far better than either the conventional acrylic lacquer or the stabilized urethane topcoats. Reacting the piperidinol stabilizer into the paint by means of urethane bonds thus was found to provide the desired UV stability, as well as a high solids content and a low energy cure.

EXAMPLE II

Two more white paint formulations were made by the methods described in Example I. Their compositions are set out in Tables VI and VII.

TABLE VI
RESIN COMPOSITIONS AND PAINT FORMULATION OF SYSTEM SUBJECTED TO FLORIDA EXPOSURE

Resin VIF

| | |
|---|---|
| Diol P410$^a$ | 304.19g (1.435 equivalents) |
| Triol TP440$^a$ | 203.77g (1.435 equivalents) |
| Diisocyanate H$_{12}$MDI$^b$ | 221.32g (1.689 equivalents) |
| TMP-40H | 40.0g (0.254 equivalents) |
| Methyl Ethyl Ketone | 135.75g |
| R = 2.0, b = 0.5 | |

| $\overline{Mn}$ | $\overline{Mw}$ | Index of Heterogeniety ($\overline{Mw}/\overline{Mn}$) | Weight Fraction Diol Polyether | Weight Fraction Triol Polyether |
|---|---|---|---|---|
| 1700 | 3400 | 2.00 | 1.109 | 0.036 |

Formulation A

| Material | Weight (g) | Percent Non-Volatiles |
|---|---|---|
| Resin VIF | 460.6 | 85 |
| Cymel® 325$^c$ | 500.0 | 80 |
| RCl-6 Titanium Dioxide Pigment$^d$ | 320.0 | 100 |
| Cycat® 296-9$^c$ | 24.0 | 50 |
| Methyl Ethyl Ketone (from Resin VIF) | 70.6 | 0 |
| Methyl Propyl Ketone | 300.0 | 0 |
| Butyl Carbitol | 20.0 | 0 |
| Butyl Cellosolve | 70.0 | 0 |
| Iso-Butyl Alcohol (from Resin + 61g addition) | 173.0 | 0 |
| Total Constituents | 1948.2 | 58 |

$^a$BASF Wyandotte Pluracol® resins
$^b$E. I. DuPont de Nemours and Company - Hylene® W
$^c$Glidden-Durkee
$^d$American Cyanamid

TABLE VII
RESIN COMPOSITIONS AND PAINT FORMULATION OF SYSTEM SUBJECTED TO FLORIDA EXPOSURE

Resin VIIG

| | |
|---|---|
| Diol P410$^a$ | 331.24g (1.562 equivalents) |
| Triol TP440$^a$ | 221.87g (1.562 equivalents) |
| Diisocyanate H$_{12}$MDI$^b$ | 205.80g (1.571 equivalents) |
| TMP-40H | 41.60g (0.265 equivalents) |
| Methyl Ethyl Ketone | 141.20g |
| T = 2.4, b = 0.5 | |

| Material Designation | $\overline{Mn}$ | $\overline{Mw}$ | Index of Heterogeniety ($\overline{Mw}/\overline{Mn}$) | Weight Fraction Diol Polyether | Weight Fraction Triol Polyether |
|---|---|---|---|---|---|
| VIIG | 1100 | 2400 | 2.18 | 0.156 | 0.061 |

Formulation B

| Material | Weight (g) | Percent Non-Volatiles |
|---|---|---|
| Resin VIIG | 470.6 | 85 |
| Cymel® 325$^c$ | 500.0 | 80 |
| RCl-6 Titanium Dioxide Pigment$^d$ | 320.0 | 100 |
| Cycat® 296-9$^c$ | 26.0 | 50 |
| Methyl Ethyl Ketone (from Resin) | 70.6 | 0 |
| Methyl Propyl Ketone | 450.0 | 0 |
| Iso-Butyl Alcohol | 188.0 | 0 |
| Butyl Carbitol | 45.3 | 0 |
| Total Constituents | 2070.5 | 55 |

$^a$BASF Wyandotte Pluracol® resins
$^b$E. I. DuPont de Nemours and Company - Hylene® W
$^c$American Cyanamid Company
$^d$Glidden-Durkee These paints were applied as topcoats to phosphated steel sample coupons as in the example above for one year of Florida exposure testing.

Clear topcoat formulations were made from piperidinol containing resins VIF and VIIG by eliminating the titanium dioxide pigment and the sand milling step of the mixing. These clear coats were applied to test coupons over the white U.V. stabilized formulations A and B as well as over conventional light camel metallic and light blue metallic production acrylic paints.

Test coupons were coated with a white acrylic lacquer and a white acrylic enamel currently used in production for purposes of comparison.

All these coupons were subjected to one year of Florida exposure testing. In the test, each coupon is mounted in the bottom of a shallow, open, black box which is oriented at a 5° pitch from the horizontal facing south. These boxes are mounted on the top of a building where the coupons are exposed to the bright sunlight and damp weather of the Florida climate. This test is one of the toughest on the gloss retention characteristics of a paint.

The results of the Florida exposure test are set out in Table VIII.

TABLE VIII
12 MONTH FLORIDA EXPOSURE (20° BLACK BOX)

| Sample Description | Initial Gloss (20° Meter) | Gloss After One Year Florida | Gloss Retention (%) |
|---|---|---|---|
| White Formulation B | 86.0 | 69.5 | 80.8 |
| White Formulation B | 83.8 | 60.8 | 72.6 |
| White Formulation A | 88.4 | 82.0 | 92.7 |
| White Formulation A | 88.0 | 79.0 | 89.8 |
| White Formulation B Base Coat with Resin Composition VIF Clear Coat | 92.1 | 89.5 | 97.2 |
| White Formulation B Base Coat with Resin Composition VIIG Clear Coat | 91.4 | 89.5 | 97.9 |
| Light Camel Metallic Base Coat with Resin Composition VIF Clear Coat | 78.0 | 73.2 | 93.8 |
| Light Camel Metallic Base Coat with Resin Composition VIIG Clear Coat | 77.7 | 65.8 | 84.6 |
| Light Blue Metallic Base Coat with Resin Composition VIF Clear Coat | 88.2 | 82.3 | 93.3 |
| Light Blue Metallic Base Coat with Resin Composition VIIG Clear Coat | 88.3 | 77.4 Average | 87.6 89.0 |
| White Lacquer - Current Production Material | 77.5 | 50.2 | 64.8 |
| White Enamel - Current | 83.3 | 59.6 | 71.6 |

TABLE VIII-continued

12 MONTH FLORIDA EXPOSURE (20° BLACK BOX)

| Sample Description | Initial Gloss (20° Meter) | Gloss After One Year Florida | Gloss Retention (%) |
|---|---|---|---|
| Production Material | | | |

The production enamel and lacquer coupons, respectively, retained only about 71.6 and 64.8 percent of their initial measured gloss. The average gloss retention of the subject topcoats with piperidinol stabilizer reacted into the urethane backbone on the average retained about 89.0 percent of their original gloss.

In summary, we have developed a novel coating composition and a method of making it. We have reacted a hindered piperidine U.V. stabilizer into the resin with stable urethane bonds. Simply mixing the constituents together does not yield an acceptable paint. Rather, our method of first reacting the piperidinol stabilizer with a suitable isocyanate and thereafter reacting in a chemical excess of polyol should be followed.

As may be deduced from the Examples, we prefer to incorporate (on a chemical equivalents basis) about 0.1 to 0.5 equivalents of monohydroxy hindered piperidine per equivalent polyisocyanate and about 1.4 to 5.0 times the total isocyanate equivalents polyether polyol.

To the best of our knowledge, ours are the only known U.V. stabilized urethane paints that can be cured at low temperatures within a reasonable time by an acid catalyzed melamine crosslinking reaction. The relatively low viscosities of the binder resins allows high solids contents in the coatings.

While our invention has been described in terms of specific embodiments thereof, clearly, other forms may be readily adapted by one skilled in the art. Accordingly, our invention is to be limited only by the following claims.

The embodiments of the invention in which an exclusive property or privilege is claimed are defined as follows:

1. A sprayable high solids coating composition which produces a durable, high gloss surface finish when applied to and cured over a suitable substrate, said composition comprising a urethane binder resin which is the reaction product of (1) aliphatic polyisocyanate, a portion of said isocyanate having hindered piperidine end groups and (2) a stoichiometric excess with respect to the polyisocyanate of polyether polyols, said coating being cured by crosslinking said urethane binder resin by means of an acid catalyzed melamine crosslinking agent, the cured coating having hindered piperidine groups chemically incorporated therein to inhibit loss of coating gloss by exposure to ultraviolet radiation.

2. A resin for a high gloss urethane coating composition suitable for outdoor applications comprising the reaction product of a first constituent formed by reacting on a chemical equivalents basis about 0.1 to 0.5 chemical equivalents of monohydroxyl piperidinol per equivalent of polyfunctional aliphatic isocyanate to form piperidine group terminated isocyanate prepolymer and a second constituent consisting essentially of chemically equivalent amounts of polyether diol and polyether triol, the sum of the equivalents of the diol and triol being in the range of from about 1.4 to 5.0 times the chemical equivalents of said isocyanate in said prepolymer, said reaction product being characterized by its capacity to form a high gloss coating that is resistant to loss of gloss from exposure to ultraviolet radiation, said resistance being provided by the piperidinol constituent which is chemically incorporated into the coating by urethane bonds which are chemically stable with respect to an acid catalyzed melamine cure of the resin in the formation of a said coating.

3. A sprayable urethane coating composition comprising at least about 50 weight percent non-volatile constituents which composition produces an impact resistant and U.V. stable high gloss coating when applied to and cured over a suitable substrate, the composition comprising a urethane resin which is the reaction product of a first constituent comprising a piperidine terminated isocyanate prepolymer which is the reaction product of about 0.1 to 0.5 chemical equivalents of monohydroxyl piperidinol per equivalent of polyfunctional aliphatic isocyanate and a second constituent consisting essentially of chemically equivalent amounts of polyether diol and polyether triol, the sum of the equivalents of the polyols being in range of from about 1.4 to 5.0 times the total equivalents of isocyanate, the resultant urethane resin thus having unreacted hydroxyl groups; and added to said resin an amount of partially methylolated melamine sufficient to cure said coating composition by crosslinking the resin at said unreacted hydroxyl groups when the composition is heated to a suitable elevated temperature, said cure being accelerated by a catalytic amount of a weak acid compatible with the coating composition, the incorporation of said piperidinol in the cured coating providing it with resistance to loss of gloss due to exposure to ultraviolet radiation.

4. A heat curable high gloss urethane coating composition that is suitable for automotive topcoat applications due to its gloss stability upon extended exposure to ultraviolet radiation the non-volatile portion of said composition comprising on a weight basis 100 parts methylene bis(4-cyclohexyl isocyanate) prereacted with from about 10–30 parts 2,2,6,6-tetramethyl-4-piperidinol ultraviolet stabilizer; from about 100–250 parts of polyether diol having an average molecular weight of about 300–1500 grams per mole and from about 50–150 parts polyether triol having an average molecular weight of about 300–2500 grams per mole to provide flexibility to said coating; from about 350–450 parts trimethylolated melamine crosslinking agent; and of pyrophosphoric acid sufficient to accelerate said crosslinking agent; wherein said composition the piperidinol constituent is reacted into the coating by means of a stable urethane linkages to the isocyanate constituent thereof which piperidine substantially inhibits gloss deterioration of a cured coating due to exposure to ultraviolet radiation.

5. A method of making a low viscosity, high solids urethane resin which forms a durable, UV-stable, high gloss coating when applied to a suitable substrate and heated in the presence of an acid catalyzed melamine crosslinking agent, the method comprising reacting a hindered piperidinol constituent with a stoichiometric excess of polyisocyanate to form an isocyanate prepolymer having hindered piperidine end groups, said piperidine and polyisocyanate constituents being joined by urethane linkages; and thereafter reacting said isocyanate prepolymer with a stoichiometric excess of polyether polyols to form a said coating resin having functional hydroxyl groups whereat the resin can be crosslinked by the said melamine crosslinking agent, whereby said method UV-stabilizing hindered piperidine groups are chemically reacted into the coating.

6. A method of making a sprayable urethane coating composition that is impact resistant and gloss-stable upon exposure to ultraviolet radiation when applied to and cured over a suitable substrate, which composition comprises less than about fifty weight percent nonvolatile constituents, the method comprising the steps of reacting in suitable solvents and in terms of chemically equivalent amounts from about 0.1 to 0.5 chemical equivalents of monohydroxyl piperidinol per chemical equivalent of polyfunctional aliphatic isocyanate to produce an isocyanate prepolymer having piperidine end groups; reacting said prepolymer with substantially chemically equivalent amounts of polyether diol and polyether triol, the sum of the total equivalents of the polyols being in the range of from about 1.4 to 5.0 times the total chemical equivalents of said polyfunctional isocyanate to form a urethane resin having unreacted functional hydroxyl groups; adding to said resin an amount of partially methylolated melamine sufficient to cure said coating composition by crosslinking said urethane resin at the hydroxyl groups; adding a catalytic amount of a weak acid compatible with the coating composition to accelerate the crosslinking reaction of said melamine; whereby said method the piperidinol constituent is incorporated into the composition by stable urethane bonds to provide a said cured coating composition with resistance to degradation caused by exposure to ultraviolet radiation.

7. A method of making a high gloss urethane coating composition that is suitable for automotive topcoat applications due to its gloss stability upon extended exposure to sunlight and weather comprising the steps of reacting on a weight basis 100 parts methylene bis(4-cyclohexyl isocyanate) and from about 10–30 parts 2,2,6,6-tetramethyl-4-piperidinol to form a piperidine terminated isocyanate prepolymer; reacting with said prepolymer from about 100–250 weight parts polypropylene oxide diol having an average molecular weight of from about 350–1500 grams per mole and from about 50–150 parts polyether triol having an average molecular weight of from about 300–2500 grams per mole to form a urethane binder resin having free functional hydroxyl groups; and adding to said resin about 350–450 parts trimethylolated melamine and at least about 2 weight percent of said melamine of pyrophosphoric acid, said melamine serving to crosslink said resin at the hydroxyl groups when the coating composition is heated and said acid serving to catalyze said cure; whereby said method the piperidinol constituent is reacted into the coating composition by means of stable urethane linkages to prevent deterioration of gloss due to exposure to ultraviolet radiation.

* * * * *